UNITED STATES PATENT OFFICE.

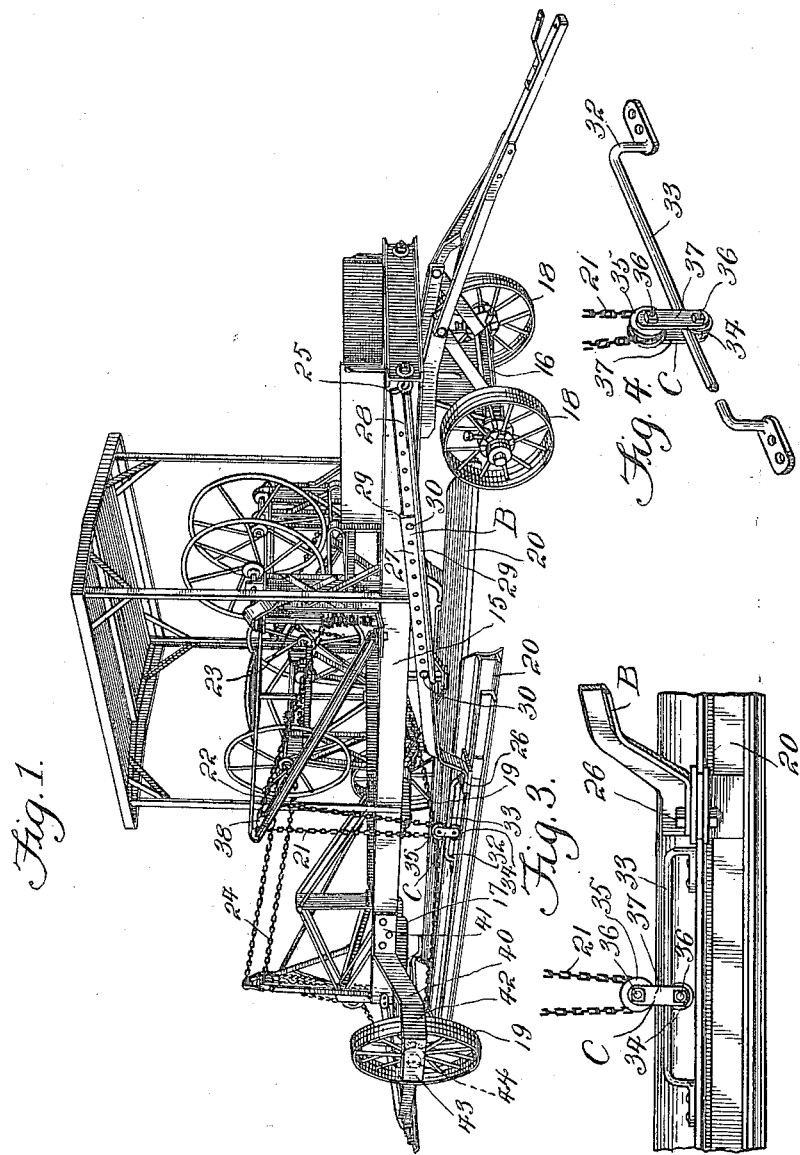

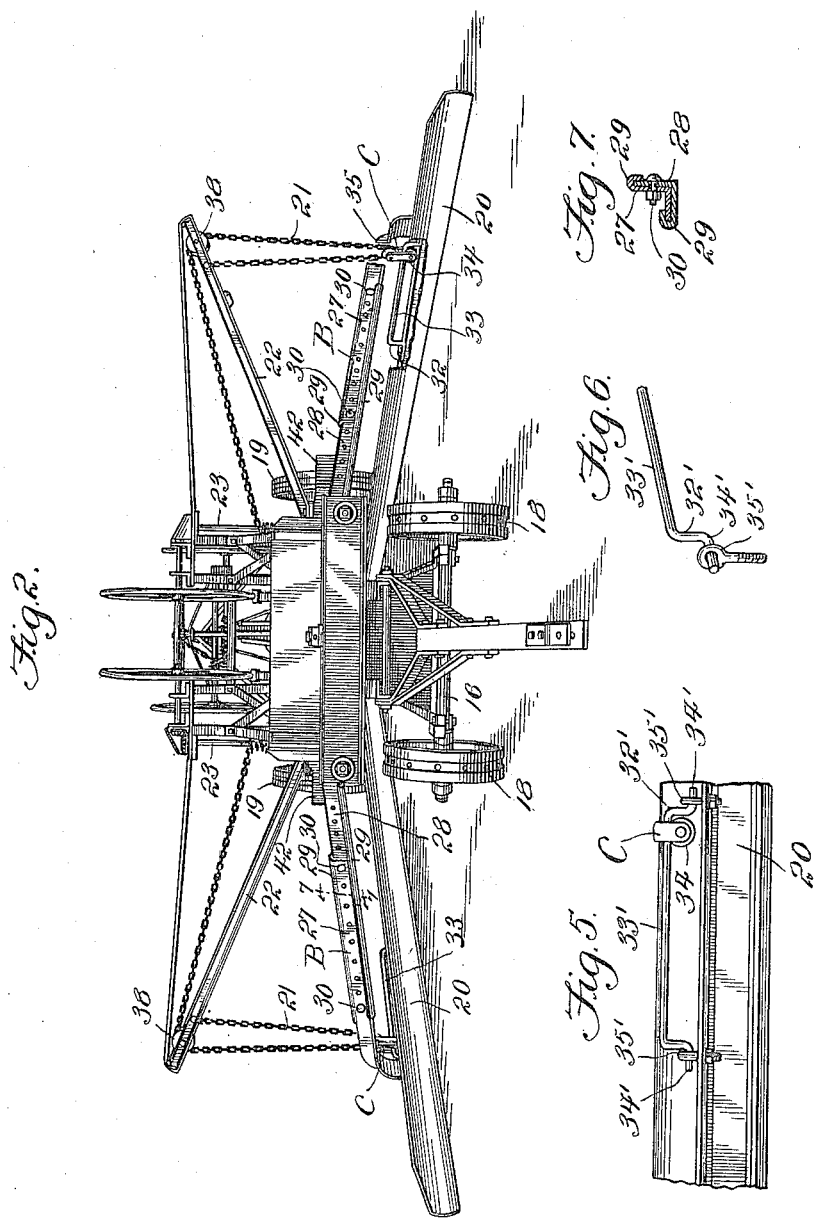

NATHANIEL S. MONROE, OF ARTHUR, ILLINOIS.

ROAD-MACHINE.

1,215,045.  Specification of Letters Patent.  Patented Feb. 6, 1917.

Application filed June 16, 1915. Serial No. 34,380.

*To all whom it may concern:*

Be it known that I, NATHANIEL S. MONROE, a citizen of the United States, residing at Arthur, in the county of Douglas and State of Illinois, have invented certain new and useful Improvements in Road-Machines, of which the following is a specification.

This invention relates to road machines of that general type in which rearwardly converging scrapers are carried by a wheeled frame, the carrying means including cranes and tackle whereby the forward ends of the scrapers are carried and supported, and spreader links whereby the forward ends of the scrapers are connected with the frame, each scraper being pivotally connected with one end of a spreader link, the other end of such spreader link being pivotally connected with the wheeled frame of the machine. A machine of the general type referred to may be seen in the patent reissued to me on March 31, 1914, No. 13,708, although the machine shown in the present application shows a more highly developed and workmanlike structure.

In some lately improved machines I have, in place of rigid or one piece spreader links, made use of spreader links of telescopic construction, substantially as shown in copending application Serial No. 807,650, filed by me on December 19, 1913, and patented Feb. 22, 1916, No. 1,173,014, several forms of such telescopic links being shown. I have found when telescoping links are employed that the supporting pulleys connected with the spreader bars and over which the chains constituting part of the hoisting tackle are trained would be moved to a position materially out of vertical alinement with the pulleys carried by the cranes, thereby causing a severe side strain or stress on the hoisting apparatus, which side strain it is one of the purposes of the hoisting cranes to avoid; an object which has been attained with a considerable measure of success until the introduction of the telescoping links.

The object of the present invention is to devise a construction whereby such side strain will be done away with as completely as possible, and particularly when spreader links of telescopic construction are used.

A further object of the invention is to provide a movable and self-adjusting guide pulley over which the hoisting chain may be trained.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Figure 1 is a perspective view of a road machine to which the invention has been applied, said machine being equipped with spreader links of the telescopic type, and the scraper bars being shown collapsed.

Fig. 2 is a perspective front view of the machine, the scraper bars being shown extended, and parts having been broken away to more completely illustrate the invention.

Fig. 3 is a side view of a portion of one of the scraper bars and related parts.

Fig. 4 is a perspective view of one of the track bars or keepers and related parts.

Fig. 5 is a side view of a portion of one of the scraper bars showing a modification.

Fig. 6 is a perspective detail view showing a portion of a track bar or keeper illustrating the modification shown in Fig. 5.

Fig. 7 is a transverse sectional detail view through one of the adjusting links.

Corresponding parts in the several figures are denoted by like characters of reference.

The frame or platform 15 is supported on front and rear axles 16, 17 having wheels 18, 19. The rearwardly converging scraper bars shown at 20 are supported at their front ends by means of hoisting tackle including chains 21, swinging cranes 22 and drum shafts 23 with which the hoisting chains are connected and on which they are wound, said drum shafts being driven by gearing which it is not necessary to describe in detail. The rearward ends of the scraper bars are adjustably supported by means of a hoisting device including a suitably guided chain 24 and a drum shaft on which the latter is wound. The forward ends of the scraper bars are connected with the frame by what I term spreader links B, said links being pivotally connected at one end, as at 25, with the frame of the machine and at the other end, as at 26, with a scraper bar. The links B have been shown of telescopic construction, each link consisting of two angle bars 27, 28, each having a U-shaped flap 29 overlapping a flange of the other or mating bar as best seen in Fig. 7. It is to be understood, however, that this construction may be widely varied and that any spreader link of a telescopic construction will be deemed within the purview of the present invention. Means are to be provided whereby the telescoping members may be fixedly connected together at various adjustments: in the drawings bolts 30 have been shown for this purpose, several apertures being provided for the passage of said bolts in order that various adjustments may be effected, but it may again be stated that any ordinary and well known connecting means may be employed. As hereinbefore stated, a copending application filed by me shows various constructions, each of which is different from the particular construction herein shown, but any one of which may be adopted as well as numerous other constructions which have not been shown.

The hoisting chains 21 are trained over guide pulleys which have heretofore been connected with the scraper bars at points closely adjacent to the pivotal connecting points of said scraper bars with the links B. Under the present invention each scraper bar is provided with an upstanding bail or keeper 32, the bridge portion of which 33 forms a track bar on which is guided a carriage C having a grooved pulley 34 engaging the track bar 33 and an additional pulley 35 over which the chain 21 is trained, said pulleys 34 and 35 being journaled on spindles 36 which also serve to connect the cheeks or side pieces 37 of the carriage C.

Under the slightly modified construction illustrated in Fig. 5 the bail or keeper, here designated by 32' and which includes a track bar, here designated by 33', is pivotally connected with the scraper bar 20 for swinging movement with respect thereto, the limbs of the bail 32 being provided with spindles 34' engaging keepers 35' with which the scraper bar is provided. It will be readily seen that this construction will add to the flexibility of the support, and it may, therefore, at times be deemed advantageous and preferable.

It will be very readily seen that whenever the positions of the cranes 22 are shifted, due to the spreading or collapsing of the scrapers, the carriage C will automatically adjust itself to a point as nearly as possible in vertical alinement with the guide pulley 38 carried by the crane, and especially is this the case when the spreader links B are collapsed or extended. In order to make ample provision for the proper adjustment of the carriage it is desirable that the track bar 33 should be of a length approximately equal to the capacity of the extension and collapse of the telescopic link bars, although this may not be absolutely essential.

While the invention has been shown as being applied to a machine having telescoping spreader links, its application is obviously not limited thereto, but it may be advantageously applied to machines having non-collapsible spreader links.

In the drawings there have been shown wheel guards applied to the rear supporting wheels of the frame, said guards consisting of channel plates 40 having their forward ends bolted upon or otherwise attached to the side members of the supporting frame 15, as seen at 41. The channel bars or plates are bent obliquely in an outward and rearward direction forming offsets 42, said offset portions extending in front of the rear wheels 19; the rearward end portions of the channel bars are bent to form portions 43 lying in substantially parallel relation to the side bars of the frame, but abutting upon the wheel carrying spindles 44. It has been found in practice that these machines, which are very heavy and which are usually drawn by powerful tractors, occasionally are liable to skid or to slide sidewise, especially when the roads are wet and slippery. When such skidding occurs, collisions are liable to happen between the hind wheels and any obstructions that may be present, such as telephone poles, bridge abutments and the like, and accidents involving the necessity of more or less costly repairs, as well as vexatious delays, have been known to take place in this manner.

I have found that the wheel guard when applied will deflect the machine when an obstruction is encountered, thereby avoiding accidents of the character named.

Having thus described the invention, what is claimed as new, is:—

1. In a machine of the class described and including a wheeled frame, a scraper bar, a spreader link pivotally connecting said scraper bar with the frame, and adjusting and supporting means for said scraper bar including a suitably guided chain, and a guide pulley connected with the scraper bar for free sliding movement longitudinally thereof and over which said chain is trained.

2. In a machine of the class described, a wheeled frame, a scraper bar, a spreader link pivotally connecting the scraper bar with the frame, means for supporting and adjusting the scraper bar including a hoisting chain and a drum shaft on which said chain may be wound, a guide pulley for said chain supported on the wheeled frame, and a second guide pulley over which the hoisting chain is trained, said second guide pulley being movably connected with the scraper for self-adjusting longitudinal movement with respect thereto.

3. In a machine of the class described, a wheeled frame, a scraper bar, a spreader link pivotally connecting the scraper bar with the frame, means for adjustably and flexibly supporting the scraper bar with respect to the frame including a guided chain and a drum shaft on which said chain may be wound, a swinging crane mounted on the frame, a guide pulley for the chain carried by said crane, and a second guide pulley over which the chain is trained, said second guide pulley being connected with the scraper bar for self-adjusting longitudinal movement with respect thereto.

4. In a machine of the class described, a wheeled frame, a scraper bar, a spreader link pivotally connecting the scraper bar with the frame, means for adjusting and flexibly supporting said scraper bar including a swinging crane, a guided chain and a drum shaft on which said chain may be wound, a longitudinal track bar connected with the scraper bar, a carriage traveling on said track bar and having a guide pulley over which the hoisting chain is trained, and a second guide pulley carried by the crane.

5. In a machine of the class described, a wheeled frame, swinging cranes carried on said frame, rearwardly convergent scraper bars, spreader links pivotally connecting the scraper bars with the frame, means for vertically adjusting and flexibly supporting said scraper bars including hoisting chains and drum shafts on which said chains may be wound, guide pulleys for the hoisting chains carried by the cranes, longitudinal track bars connected with the scraper bars, carriages traveling freely and unobstructedly on said track bars, and guide pulleys on said carriages over which the hoisting chains are trained.

6. In a machine of the class described, a wheeled frame, swinging cranes carried on said frame, rearwardly convergent scraper bars, spreader links pivotally connecting the scraper bars with the frame, means for vertically adjusting and flexibly supporting said scraper bars including hoisting chains and drum shafts on which said chains may be wound, guide pulleys for the hoisting chains carried by the cranes, longitudinal track bars connected with the scraper bars, carriages traveling on said track bars, and guide pulleys on said carriages over which the hoisting chains are trained; said track bars being in the nature of elongated bails pivotally connected with the scraper bars.

7. In a machine of the class described and including a wheeled frame, a scraper bar, a telescopic spreader link pivotally connecting said scraper bar with the frame, and adjusting and supporting means for said scraper bar including a suitably guided chain, and a guide pulley connected with the scraper bar for free sliding movement longitudinally thereof and over which said chain is trained.

8. In a machine of the class described, a wheeled frame, a scraper bar, a telescopic spreader link pivotally connecting the scraper bar with the frame, means for supporting and adjusting the scraper bar including a hoisting chain and a drum shaft on which said chain may be wound, a guide pulley for said chain movably supported on the wheeled frame, and a second guide pulley over which the hoisting chain is trained, said second guide pulley being movably connected with the scraper for automatic longitudinal adjustment with respect thereto and with respect to the guide pulley movably supported on the frame.

9. In a machine of the class described, a wheeled frame, swinging cranes carried on said frame, rearwardly convergent scraper bars, telescopic spreader links pivotally connecting the scraper bars with the frame, means for vertically adjusting and flexibly supporting said scraper bars including hoisting chains and drum shafts on which said chains may be wound, guide pulleys for the hoisting chains carried by the cranes, longitudinal track bars connected with the scraper bars, carriages traveling on said track bars, and guide pulleys on said carriages over which the hoisting chains are trained; said track bars being in the nature of elongated bails pivotally connected with the scraper bars.

10. In a machine of the class described, a wheeled supporting frame, rearwardly converging scraper bars, means for vertically adjusting and flexibly supporting said scraper bars including swinging cranes mounted on the frame, guided chains and drum shafts on which said chains may be wound, telescopic spreader links pivotally connecting the forward ends of the scraper bars with the sides of the frame, longitudinal track bars connected with the scraper bars and extending rearwardly with respect to the pivotal connecting points of the scraper bars with the spreader links, carriages traveling on said track bars and having guide pulleys over which the hoisting chains are trained, and additional guide pulleys carried by the cranes and over which the hoisting chains are trained; the guide pulleys mounted on the carriages being normally maintained by said carriages in approximate vertical alinement with the guide pulleys on the cranes.

In testimony whereof I affix my signature in presence of two witnesses.

NATHANIEL S. MONROE.

Witnesses:
 WM. BAGGER,
 H. HOUGH.